(12) United States Patent
Ito et al.

(10) Patent No.: US 8,817,704 B2
(45) Date of Patent: Aug. 26, 2014

(54) WIRELESS DEVICE CAPABLE OF MULTIPLE ACCESS TO OTHER WIRELESS DEVICES

(75) Inventors: Kiyoshige Ito, Gifu (JP); Makoto Nagai, Kakamigahara (JP)

(73) Assignee: Hera Wireless S.A., Luxembourg (LU)

( * ) Notice: Subject to any disclaimer, the term of this patent is extended or adjusted under 35 U.S.C. 154(b) by 204 days.

(21) Appl. No.: 13/060,896

(22) PCT Filed: Aug. 26, 2009

(86) PCT No.: PCT/JP2009/004145
§ 371 (c)(1),
(2), (4) Date: May 11, 2011

(87) PCT Pub. No.: WO2010/023909
PCT Pub. Date: Mar. 4, 2010

(65) Prior Publication Data
US 2011/0205971 A1 Aug. 25, 2011

(30) Foreign Application Priority Data
Aug. 28, 2008 (JP) .................................. 2008-220347

(51) Int. Cl.
*H04W 4/00* (2009.01)
*H04W 88/06* (2009.01)
*H04W 88/08* (2009.01)
*H04W 92/20* (2009.01)

(52) U.S. Cl.
CPC .............. *H04W 88/06* (2013.01); *H04W 88/08* (2013.01); *H04W 92/20* (2013.01)
USPC ....................................................... 370/328

(58) Field of Classification Search
CPC ................... H04W 52/0216; H04W 52/0219; H04W 52/343; H04W 52/367; H04W 84/20; H04W 88/04; H04W 52/0261
USPC .................................................. 370/310–350
See application file for complete search history.

(56) References Cited

U.S. PATENT DOCUMENTS

| 6,901,275 B1 * | 5/2005 | Aoyagi ......................... 455/574 |
| 2008/0151801 A1 * | 6/2008 | Mizuta ......................... 370/311 |

FOREIGN PATENT DOCUMENTS

| JP | 2000-082990 | 3/2000 |
| JP | 2004-129042 | 4/2004 |

(Continued)

OTHER PUBLICATIONS

Preliminary Report of Patentability issued in International Patent Application No. PCT.JP2009/004145 dated Mar. 10, 2011.

(Continued)

*Primary Examiner* — Ricky Ngo
*Assistant Examiner* — Wei-Po Kao
(74) *Attorney, Agent, or Firm* — DC Patent Lawyers, PLLC

(57) ABSTRACT

A data processing section selects either base station mode or terminal mode and executes communication. A control section controls operations relating to the base station mode and the terminal mode. A receiving section receives an instruction to switch to the base station mode from other wireless device set in the base station mode, in the case where communication is set in the terminal mode. An AP switching section switches to the base station mode in accordance with the instruction. An instructing section instructs other wireless devices set in the terminal mode to switch to the base station mode, after a predetermined period is passed from the time when the mode is switched to the base station mode. An STA switching section switches to the terminal mode after giving the instruction.

2 Claims, 13 Drawing Sheets

(56) References Cited

FOREIGN PATENT DOCUMENTS

| | | |
|---|---|---|
| JP | 2005-536133 | 11/2005 |
| JP | 2007-135206 | 5/2007 |
| JP | 2009-038760 | 2/2009 |
| WO | WO 2006/067922 A1 | 6/2006 |

OTHER PUBLICATIONS

M. Morikura et al., "802.11 High-Speed wireless LAN text book," pp. 60-63, Impress, Inc., Jul. 21, 2005, Japan.

International Search Report issued in International Patent Application No. PCT/JP2009/004145 dated Sep. 29, 2009.

* cited by examiner

| /300 | /302 | /304 | /306 |
|---|---|---|---|
| PRIORITY LEVEL | NAME OF RADIO APPARATUS | THE REMAINING AMOUNT OF BATTERY | AP MODE PERIOD |
| 1 | RADIO APPARATUS A | R1 | P1 |
| 2 | RADIO APPARATUS B | R2 | P2 |
| 3 | RADIO APPARATUS C | R3 | P3 |
| | | | |
| N | NTH RADIO APPARATUS | RN | PN |

38

WIRELESS DEVICE CAPABLE OF MULTIPLE ACCESS TO OTHER WIRELESS DEVICES

RELATED APPLICATIONS

This application is the U.S. National Phase under 35 U.S.C. §371 of International Application No. PCT/JP2009/004145, filed on Aug. 26, 2009, which in turn claims the benefit of Japanese Application No. 2008-220347, filed on Aug. 28, 2008, the disclosures of which Applications are incorporated by reference herein.

TECHNICAL FIELD

The present invention relates to a communication technology, and it particularly relates to a radio apparatus for communicating with another radio apparatus.

BACKGROUND TECHNOLOGY

Wireless LAN (Local Area Network) complying with the standards, such as IEEE 802.11, is in wide use in recent years. Such wireless LAN includes two kinds of network configurations. One is an infrastructure mode and the other is an ad-hoc mode. It further includes a network configuration called a wireless distribution system (WDS). The infrastructure mode is configured by a base station apparatus and terminal apparatuses located within a cell site, which is formed by said base station apparatus.

A network formed by combining a base station apparatus and a plurality of terminal apparatuses connected to said base station apparatus is called a basic service set (BSS). Generally, the base station apparatus, which connects to a wired backbone network, relays packet signals between the backbone network and the terminal apparatuses. Further, the base station apparatus also relays the packet signals between the terminal apparatuses. On the other hand, the ad-hoc mode does not include the base station apparatus and is configured by terminal apparatuses only. Generally, the terminal apparatuses do not have the function of relaying the packet signals but directly transmit the packet signals between them. Also, WDS relays the packet signals even between base station apparatuses (See Non-patent Document 1, for instance).

PRIOR ART DOCUMENTS

Non-Patent Documents

[Non-patent Document 1]
Masahiro MORIKURA and Shuji KUBOTA, "802.11 High-Speed wireless LAN text book", pp. 60-63, Impress, Inc., Jan. 1, 2005, Japan.

DISCLOSURE OF THE INVENTION

Problems to be Solved by the Invention

Generally, each base station apparatus has a function as a base station apparatus (hereinafter referred to as "base station mode"), whereas each terminal apparatus has a function as a terminal apparatus (hereinafter referred to as "terminal mode"). That is, a base station apparatus and a terminal apparatus are each configured as a completely different and separate apparatus. On the other hand, a radio apparatus differing from the aforementioned configurations is proposed. In such a radio apparatus, both the base station mode and the terminal mode are implemented and either one of the modes is selected. Accordingly, in a wireless network formed by such radio apparatuses, a radio apparatus that is to select the base station mode is set arbitrarily. However, in order to maintain the stable communications in the wireless network, the base station mode or the terminal mode must be set properly in each radio apparatus.

The present invention has been made in view of the foregoing circumstances, and a purpose thereof is to provide a technology by which either one of the base station mode and the terminal mode is set properly in a radio apparatus having the two modes.

Means for Solving the Problems

In order to resolve the above problems, A radio apparatus according to one embodiment of the present invention comprises: a communication unit configured to select either one of a base station mode and a terminal mode so as to perform a communication wherein the base station mode is used to multiple-access a plurality of other radio apparatuses and the terminal mode is used to connect another radio apparatus set in the base station mode; and a control unit configured to control an operation related to the base station mode and the terminal mode in the communication unit. The control unit includes: a receiving unit configured to receive an instruction, sent from the another radio apparatus set in the base station mode, as to a switching to the base station mode, via said communication unit, when the communication unit is set in the terminal mode; a first switching unit configured to switch the communication unit to the base station mode according to the instruction received by the receiving unit; an instruction unit configured to instruct, via the communication unit, the another radio unit set in the terminal mode to switch the mode thereof to the base station mode after a predetermined period of time has elapsed after the communication unit had been switched to the base station by the first switching unit; and a second switching unit configured to switch the communication unit to the terminal mode after the instruction unit has given the instruction.

Optional combinations of the aforementioned constituting elements, and implementations of the invention in the form of methods, apparatuses, systems, recording media, computer programs and so forth may also be practiced as additional modes of the present invention.

Effect of the Invention

The present invention properly sets either one of the base station mode and the terminal mode in a radio apparatus having the two modes.

BRIEF DESCRIPTION OF THE DRAWINGS

FIG. 11 shows a structure of data of a candidate list stored in a storage of FIG. 10.

BEST MODE FOR CARRYING OUT THE INVENTION

An outline of the present invention will be given before a specific description thereof. An exemplary embodiment of the present invention relates to a communication system that performs communications in a network formed by a plurality of radio apparatuses. Each radio apparatus, which is compatible with both a base station mode and a terminal mode, selects either one of the two modes and uses the thus selected mode. As described earlier, the mode must be selected properly and there are a plurality of kinds of situations where the selection is made. Thus, a processing suitable to each situation must be carried out. Hereinbelow, a general summary of a communication system is explained in Section 1. Then a description is given of each situation in Sections 2 to 6. Note that, in addition to the aforementioned radio apparatuses, the communication system may include a normal base station apparatus and a normal terminal apparatus but they will be omitted, otherwise required, in the following description. Also, in the following, a radio apparatus compatible with both the base station mode and the terminal mode is called "radio apparatus"; a radio apparatus for exclusive use in a base station apparatus is called "base station apparatus", whereas a radio apparatus for exclusive use in a terminal apparatus is called "terminal apparatus". At the same time, a radio apparatus for use in a base station apparatus or a radio apparatus for use in a terminal apparatus may be sometimes called "radio apparatus" as well.

1. Summary of Operations

A communication system is compatible with an infrastructure mode, an ad-hoc mode and WDS (communications between access points (APs)). Also, the communication system is compatible with a mode in which a radio apparatus, which is compatible with both the base station mode and the terminal mode, selects either one of the base station mode and the terminal mode and then performs communications; this mode is hereinafter referred to as "switching mode". A brief description is first given of the configuration of the infrastructure mode, the ad-hoc mode and the switching mode, respectively, as the configurations of the communication system.

Figure 1A:
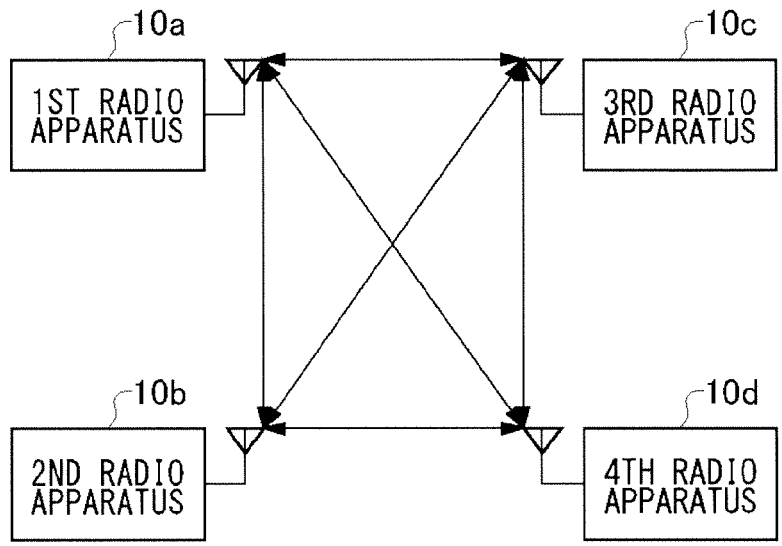
FIGS. 1A and 1B each illustrates a configuration of a communication system according to an exemplary embodiment of the present invention.
Figure 1B:
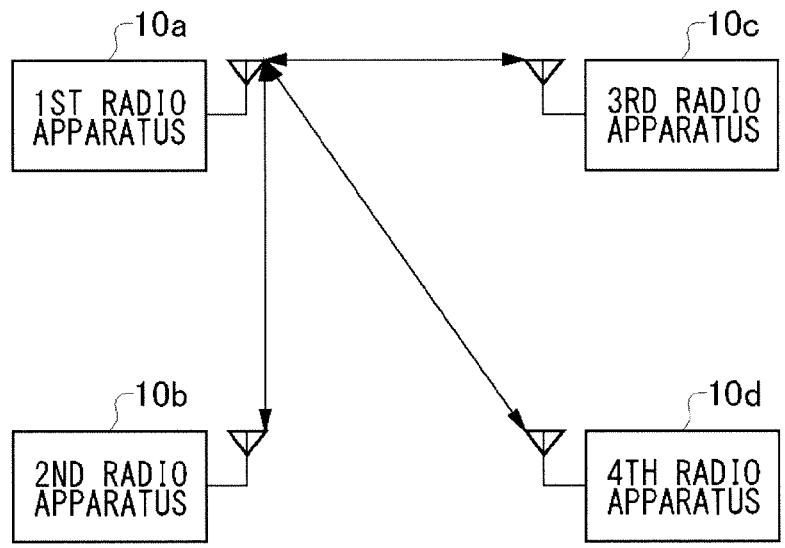

FIGS. 1A and 1B each illustrates a configuration of a communication system 100 according to an exemplary embodiment of the present invention. The communication system 100 includes a first radio apparatus 10a, a second radio apparatus 10b, a third radio apparatus 10c, and a fourth radio apparatus 10d, which are generically referred to as "radio apparatus 10" or "radio apparatuses 10". FIG. 1A illustrates a case where the four radio apparatuses 10 are operating in the ad-hoc mode. Each radio apparatus 10 selects the terminal mode or is a terminal apparatus itself. Though known art may be used in a communication processing in an ad-hoc network and therefore the description thereof is omitted here, a radio apparatus 10 directly transmits packet signals to another radio apparatus 10 to be communicated therewith.

FIG. 1B illustrates a case where the four radio apparatuses 10 are operating in the infrastructure mode. The first radio apparatus 10a selects the base station mode or is a base station apparatus itself. On the other hand, the second radio apparatus 10b, the third radio apparatus 10c, and the fourth radio apparatus 10d each selects the terminal mode or are each a terminal apparatus itself. In the communications between the radio apparatuses 10 in the terminal mode, the packet signals are relayed by a radio apparatus 10 in the base station mode. For example, if the packet signals are to be transmitted from the second radio apparatus 10b to the fourth radio apparatus 10d, the second radio apparatus 10b first transmits the packet signals to the first radio apparatus 10a. The first radio apparatus 10a transmits the received packet signals to the fourth radio apparatus 10d.

In other words, the radio apparatus 10 in the base station mode or the base station apparatus itself transmits and receives packet signals containing data indicating that an initial source and a final destination are not the own radio apparatus itself. In the case of the aforementioned example, the first source of data is the second radio apparatus 10b, whereas the final destination of data is the fourth radio apparatus 10d; thus the first radio apparatus 10a in the base station mode is included in neither of them. On the other hand, the radio apparatus 10 in the terminal mode or the terminal apparatus itself transmits and receives packet signals containing data indicating that the initial source or the final destination is the own radio apparatus itself. In the case of the aforementioned example, the packet signals transmitted from the second radio apparatus 10b contain data indicating that the second radio apparatus 10b is the initial source, and the packet signals received by the fourth radio apparatus 10d contain data indicating that the fourth radio apparatus 10d is the final destination. The same thing applies to the ad-hoc network illustrated in FIG. 1A.

Figure 2A:
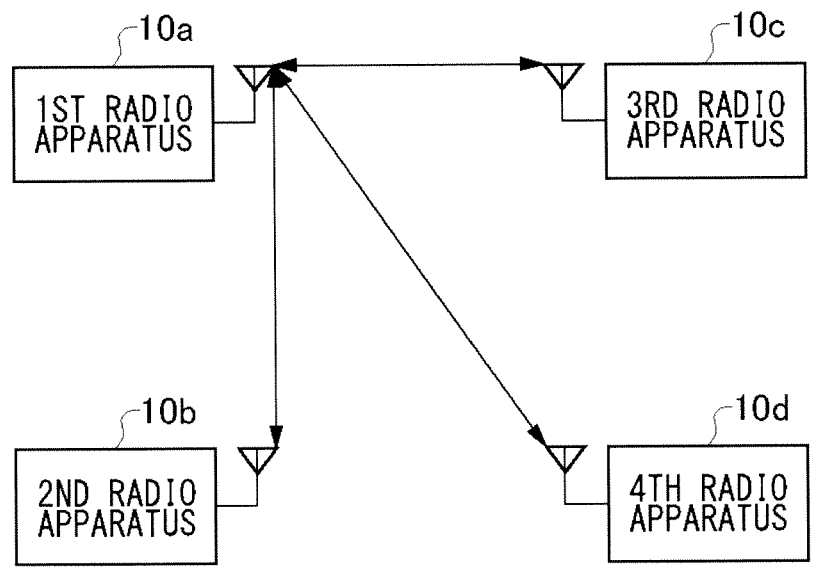
FIGS. 2A and 2B each illustrates another configuration of a communication system according to an exemplary embodiment of the present invention.
Figure 2B:
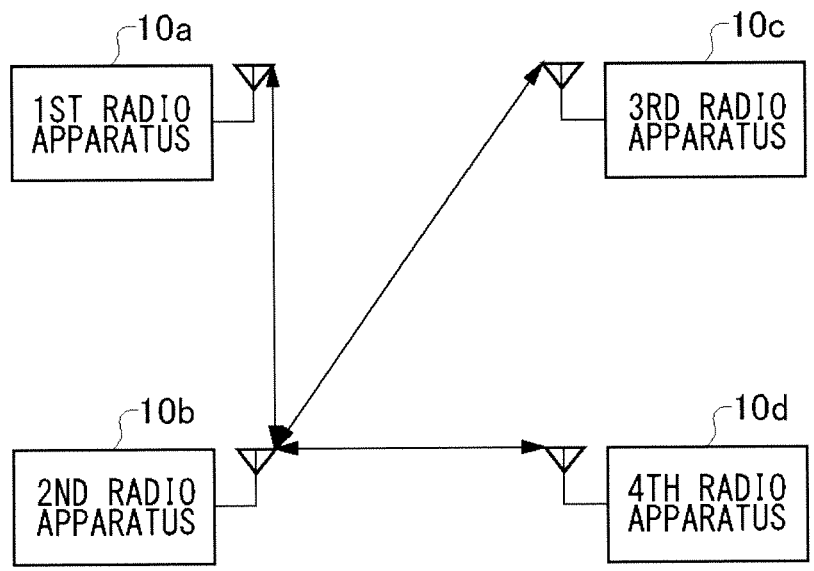

FIGS. 2A and 2B each illustrates another configuration of the communication system 100 according to an exemplary embodiment of the present invention. FIGS. 2A and 2B illustrate a case where the four radio apparatuses 10 are operating in a switching mode. In FIG. 2A, the first radio apparatus 10a operates in the base station mode, whereas the second radio apparatus 10b, the third radio apparatus 10c and the fourth radio apparatus 10d operate in the terminal mode. On the other hand, in FIG. 2B, the second radio apparatus 10b operates in the base station mode, whereas the first radio apparatus 10a, the third radio apparatus 10c and the fourth radio apparatus 10d operate in the terminal mode. In the switching mode, the state as illustrated in FIG. 2A and the state as illustrated in FIG. 2B are switched between them as appropriate. It is noted here that the time duration during which and the timing at which the switching to be performed may be optional. Note also that the state as illustrated in FIG. 2A is equivalent to that as illustrated in FIG. 1B. That is, in the switching mode, the processing similar to that in the infrastructure mode is performed with predetermined timing, and only the difference therebetween is whether a radio apparatus 10 serving as the base station apparatus is to be changed or not.

2. The Setting of Mode at Power-on

An outline is first described. Where a radio apparatus 10 is equipped with the infrastructure mode, the ad-hoc mode and the switching mode, the radio apparatus 10 needs to select a mode from among these operation modes at the power-on. Generally, at the time the apparatus is activated, a user wishes to use a certain operation mode. Accordingly, an operation mode reflecting the user's intention is preferably selected. If the radio apparatus 10 is activated in the switching mode, the radio apparatus 10 must select either the base station mode or the terminal mode. Since there is a possibility that there may already exist another radio apparatus 10 operating in the base station mode or the terminal mode on the periphery of said radio apparatus 10, the selection of a mode is preferably determined based on the mode used by the another radio apparatus 10 located around said radio apparatus 10. In order to cope with this, the radio apparatus 10 according to the exemplary embodiment carries out the following operations.

The radio apparatus 10 receives an instruction as to the selection of any one of the infrastructure mode, the ad-hoc mode and the switching mode from the user before the power-on. Then the radio apparatus 10 selects the operation mode to be used, in accordance with the instruction received. The radio apparatus 10 performs the setting so that the radio apparatus 10 can be operated in the selected operation mode. If, on the other hand, the radio apparatus 10 is activated in the switching mode, it will execute the terminal mode in an initial state. In other words, the radio apparatus 10 starts to function as a terminal apparatus. Then, the radio apparatus 10 receives a broadcast signal, namely a beacon signal, from other radio apparatuses 10 over a certain period of time. If no such beacon signals are received, the mode used in the radio apparatus 10 will be switched to the base station mode from the terminal mode because it is estimated that there is no radio apparatus 10 in the base station mode on the periphery of said radio apparatus 10.

Figure 3:
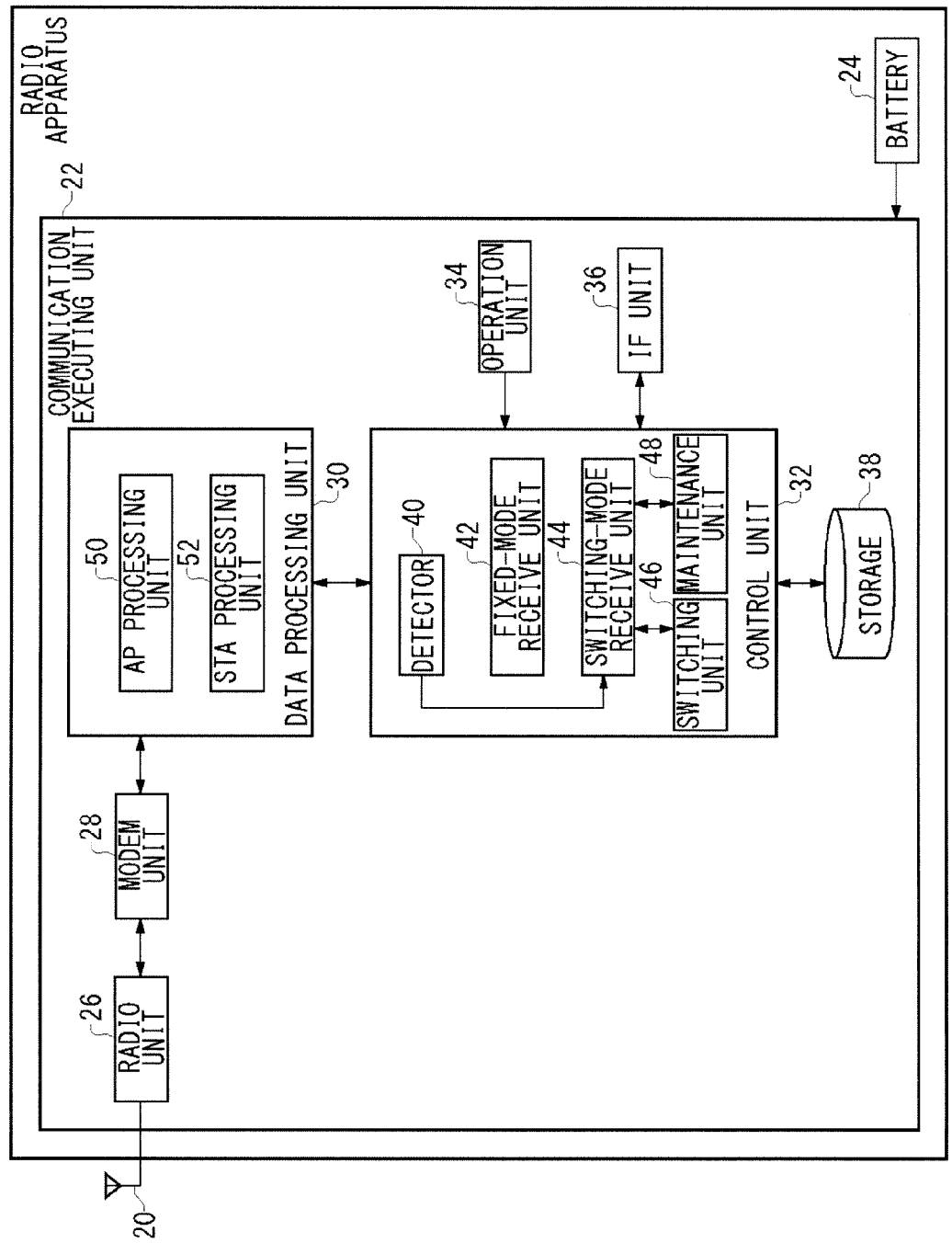
FIG. 3 illustrates a structure of a radio apparatus according to an exemplary embodiment of the present invention.

FIG. 3 illustrates a structure of a radio apparatus 10 according to an exemplary embodiment of the present invention. The radio apparatus 10 includes an antenna 20, a communication executing unit 22, and a battery 24. The communication executing unit 22 includes a radio unit 26, a modem unit 28, a data processing unit 30, a control unit 32, an operation unit (control module) 34, an IF unit 36, and a storage 38. The data processing unit 30 includes an AP processing unit 50, and an STA processing unit 52. The control unit 32 includes a detector 40, a fixed-mode receive unit 42, a switching-mode receive unit 44, a switching unit 46, and a maintenance unit 48.

The radio unit 26 communicates with other radio apparatuses 10, using the packet signals. As a receiving processing, the radio unit 26 carries out frequency conversion of the radiofrequency packet signals received via the antenna 20 so as to generate baseband packet signals. Then the radio unit 26 outputs the baseband packet signals to the modem unit 28. The baseband packet signal, which is composed of in-phase components and quadrature components, shall generally be transmitted by two signal lines. For the clarity of Figure, those are presented here by a single signal line. An LNA (Low Noise Amplifier), an mixer, an AGC unit and an A-D conversion unit are also included in the radio unit 26.

As a transmission processing, the radio unit 26 carries out frequency conversion of the baseband packet signals inputted from the modem unit 28 so as to generate radiofrequency packet signals. Then the radio unit 26 transmits the radiofrequency packet signals via the antenna 20. A PA (Power Amplifier), a mixer and a D-A conversion unit are also included in the radio unit 26.

As a receiving processing, the modem unit 28 demodulates the packet signals fed from the radio unit 26. Then the modem unit 28 outputs the demodulation result to the data processing unit 30. As a transmission processing, the modem 28 modulates the data sent from the data processing unit 30. Then the modem unit 28 outputs the modulation result to the radio unit 26 as baseband packet signals. If the radio apparatus 10 is compatible with the IEEE 802.11a or like standard which is based on the OFDM scheme, the modem unit 28 will also perform FFT (Fast Fourier Transform) as a receiving processing, and it will also perform IFFT (Inverse Fast Fourier Transform) as a transmission processing.

If the radio apparatus 10 is compatible with a spread spectrum scheme (e.g., IEEE 802.11b), the modem unit 28 will also perform inverse spreading as a receiving processing and also perform spreading as a transmission processing. If the radio apparatus 10 is compatible with a MIMO (Multiple-Input Multiple-Output) scheme (e.g., IEEE 802.11n), the modem unit 28 will also perform adaptive array signal processing as a receiving processing and also distribute data streams to multiple streams as a transmission processing.

The AP processing unit 50 carries out the processing for the aforementioned base station mode. Known art used for a base station apparatus may be employed as the processing for the base station mode and therefore the description thereof is omitted here. However, as described above, the AP processing unit 50 at least relays the communications between the not-shown radio apparatuses 10 in the terminal mode. In other words, the AP processing unit 50 receives data which are the demodulation result fed from the modem unit 28, as a receiving processing. The final destination of said data is not its own radio apparatus 10 but another radio apparatus 10 (not shown). While setting the not-shown another radio apparatus 10 as the final destination in the transmission processing, the AP processing unit 50 outputs the received data to the modem unit 28. The initial source of said data is not its own radio apparatus 10 but the not-shown another radio apparatus 10 which has transmitted the data received in the receiving processing.

The STA processing unit 52 carries out the processing for the aforementioned terminal mode. Known art used for a terminal apparatus may be employed as the processing for the terminal mode and therefore the description thereof is omitted here. However, the STA processing unit 52 is installed at least in an end position of the network and does not perform the relaying processing. In other words, the STA processing unit 52 receives data which are the demodulation result fed from the modem unit 28, as a receiving processing. The final destination of said data is its own radio apparatus 10. The STA processing unit 52 performs a predetermined processing on the received data and then outputs its result to the control unit 32. While setting another radio apparatus 10 (not-shown) as the final destination in the transmission processing, the STA processing unit 52 outputs the data received from the control unit 32, to the modem unit 28. The initial source of said data is its own radio apparatus 10.

The control unit 32 controls the operations related to the base station mode and the terminal mode in the data processing unit 30. That is, the control unit 32 selects either the operation of the AP processing unit 50 or the operation of the STA processing unit 52. The control unit 32 defines an infrastructure mode, an ad-hoc mode and a switching mode as the operation modes, and selects one of the three operation modes. As described already, the ad-hoc mode is an operation mode in which the AP processing unit 50 or the STA processing unit 52 is used constantly, whereas the switching mode is an operation mode in which the AP processing unit 50 and the STA processing unit 52 are used by switching back and forth between them. Note that when the ad-hoc mode is used, the STA processing units 52 only are used.

The operation unit 34, which is provided with buttons and the like, receives instructions from the user. If the radio apparatus 10 is so configured as to be connected to a personal computer, the operation unit 34 may be a keyboard or a mouse provided in the personal computer. The IF unit 36 is an interface with not-shown devices or their components. For example, if the radio apparatus 10 is connected to a personal computer and a printer, the IF unit 36 will be an interface with the personal computer and the printer. If, on the other hand, the radio apparatus 10 is built inside a handheld terminal device or the like, the IF unit 36 will be an interface with, for example, a display unit, a speaker and a CPU which are components of the handheld terminal device.

The user enters his/her instruction on the selection of the operation modes by the use of the operation unit 34. That is, the instruction on the selection for the infrastructure mode, the ad-hoc mode and the switching mode is inputted. If the infrastructure mode is inputted, the instruction on the selection of the base station mode or the terminal mode is inputted as well. If the instruction entered by the operation unit 34 is either an instruction to select the infrastructure mode or an instruction to select the ad-hoc mode, the fixed-mode receive unit 42 will receive either one of the instructions. If the fixed-mode receive unit 42 has received the instruction to select the infrastructure mode, the fixed-mode receive unit 42 will also receive the instruction on the selection of the base station mode or the terminal mode.

If the instruction entered by the operation unit 34 is the instruction to select the switching mode, the switching-mode receive unit 44 will receive this instruction. At the time the radio apparatus 10 is activated, the control unit 32 selects one of the infrastructure mode, the ad-hoc mode and the switching mode, as the operation mode of the data processing unit 30, and sets the thus selected operation mode. Then, the control unit 32 activates either one of the AP processing unit 50 and the STA processing unit 52 according to the operation mode set. More specifically, when the fixed-mode receive unit 42 receives the instruction to select the infrastructure mode and the instruction to select the base station mode, the control unit 32 will activate the AP processing unit 50.

On the other hand, when the fixed-mode receive unit 42 receives the instruction to select the infrastructure mode and the instruction to select the terminal mode or when the fixed-mode receive unit 42 receives the instruction to select the ad-hoc mode, the control unit 32 activates the STA processing unit 52. When the switching-mode receive unit 44 receives the instruction to select the switching mode, the control unit 32 activates the STA processing unit 52. That is, when the mode is set to the switching mode, the STA processing unit 52 activates the radio apparatus 10 by selecting the STA processing unit 52. When the radio apparatus 10 operates in the infrastructure mode or the ad-hoc mode, the base station mode or the terminal mode is specified by a user's instruction in the control unit 32. On the other hand, when the radio apparatus 10 operates in the switching mode, the base station mode or the terminal mode is not specified by the user's instruction in the control unit 32 but the terminal mode is automatically selected as the initial value.

The storage 38 stores various types of data and settings. For example, the storage 38 stores the settings received by the fixed-mode receive unit 42 and the switching-mode receive unit 44. The battery 24 is a power supply that drives the radio apparatus 10. The radio apparatus 10 may be driven by an AC adaptor instead of the battery 24.

In what is to follow, a description is given of a processing carried out when a radio apparatus 10 is started. In such a case, the STA processing unit 52 is started, as described above. The detector 40 detects a packet signal, received via the radio unit 26, the modem unit 28 and the STA processing unit 52 from not-shown other radio apparatuses 10, before a certain period of time has elapsed after the power-on. Here, the packet signal received from not-shown other radio apparatuses is a packet signal containing a broadcast signal, namely a beacon signal. When such a beacon signal is received, this means that there is at least another radio apparatus 10 in the base station mode or a base station apparatus located near said radio apparatus 10. If no beacon signal is detected during the certain period of time, the detector 40 will inform the switching-mode receive unit 44 accordingly. Further, the switching-mode receive unit 44 informs the switching unit 46 accordingly. Upon receipt of the notification, the switching unit 46 stops the operation of the STA processing unit 52 and starts the operation of the AP processing unit 50. In other words, the switching unit 46 switches the operation of the data processing unit 30 from the terminal mode to the base station mode.

If the detector 40 detects the beacon signal during the certain period of time, the detector 40 will output the content of the beacon signal and convey the fact that the beacon signal has been detected, to the switching-mode receive unit 44. Note here that the beacon signal contains information on an apparatus that has transmitted the beacon signal. One of such items of information is information on whether the source of the beacon signal belongs to another radio apparatus compatible with the base station mode and terminal mode or a normal base station. Upon receipt of the fact that the beacon signal has been detected, the switching-mode receive unit 44 checks the type of a source apparatus, based on the content of the beacon signal. If the source apparatus is another radio apparatus compatible with the base station mode and the terminal mode, the switching-mode receive unit 44 will output the received information to the maintenance unit 48. If, on the other hand, the source apparatus is a normal base station apparatus, the switching-mode receive unit 44 will output the received information to the switching unit 46.

Upon receipt of the information from the switching-mode receive unit 44, the maintenance unit 48 maintains the operation of the STA processing unit 52. In other words, the maintenance unit 48 maintains the setting of the terminal mode. Upon receipt of the information from the switching-mode receive unit 44, the switching unit 46 stops the operation of the STA processing unit 52 and starts the operation of the AP processing unit 50.

This structure may be implemented hardwarewise by elements such as a CPU, memory and other LSIs of an arbitrary computer, and softwarewise by memory-loaded programs having communication functions or the like. Depicted herein are functional blocks implemented by cooperation of hardware and software. Therefore, it will be obvious to those skilled in the art that the functional blocks may be implemented by a variety of manners including hardware only, software only or a combination of both.

Figure 4:
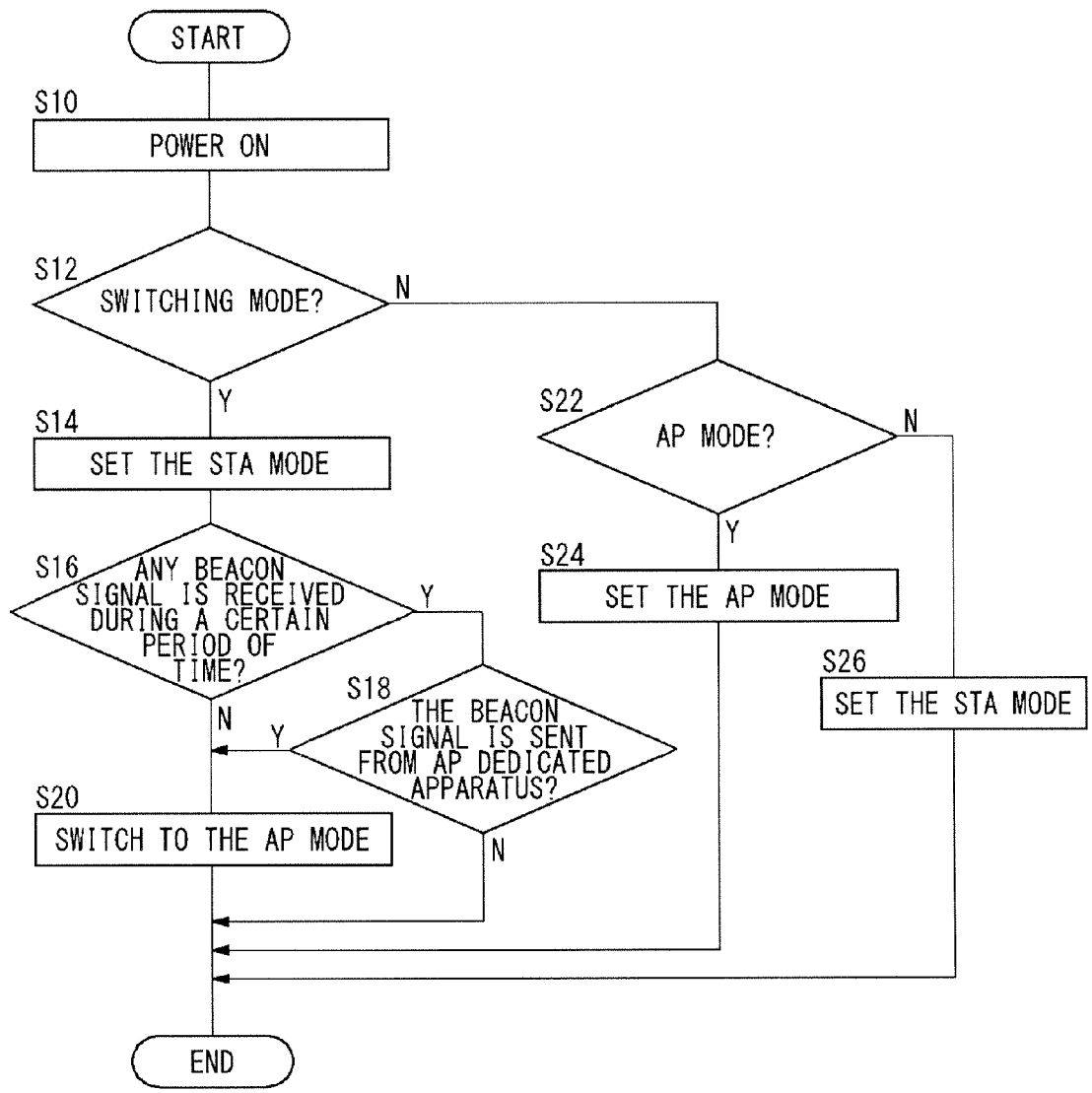
FIG. 4 is a flowchart showing a setting procedure performed by the radio apparatus of FIG. 3.

An operation of the communication system 100 structured as above is now described. FIG. 4 is a flowchart showing a setting procedure performed by a radio apparatus 10. Power is ON (S10). If the switching-mode receive unit 44 has received an instruction to start in the switching mode (Y of S12), the control unit 32 will start the operation of the STA processing unit 52. In other words, the control unit 32 sets the terminal mode (S14). Hereinafter, the terminal mode will be referred to as "STA mode" also, and no distinction will be made between the terms "terminal mode" and "STA mode". If the detector 40 does not receive any beacon signal during a certain period of time (N of S16), the switching unit 46 will stop the operation of the STA processing unit 52 and start the operation of the AP processing unit 50. In other words, the switching unit 46 switches the mode to the base station mode (S20). Hereinafter, the base station mode will be referred to as "AP mode" also, and no distinction will be made between the terms "base station mode" and "AP mode".

If, on the other hand, the detector 40 receives the beacon signal during the certain period of time (Y of S16) and the source of the beacon signal is a normal base station apparatus (Y of S18), the switching unit 46 will switch the mode to the AP mode (S20). Hereinafter, the normal base station apparatus will be referred to as an "AP dedicated apparatus" also, and no distinction will be made between the terms "normal base station apparatus" and "AP dedicated apparatus". If the source of the beacon signal is not the AP dedicated apparatus (N of S18), the processing will be terminated. If the switching-mode receive unit 44 does not receive an instruction to start in the switching mode (N of S12), namely if the fixed-mode receive unit 42 receives an instruction to start in the infrastructure mode or the ad-hoc mode, the fixed-mode receive unit 42 will check if it is the AP mode or the STA mode. If it is the AP mode (Y of S22), the control unit 32 will start the operation of the AP processing unit 50. That is, the control unit 32 sets the AP mode (S24). If, it is not the AP mode (N of S22), the control unit 32 will set the STA mode (S26).

By employing the present exemplary embodiment, the operation mode is selected based on a user's instruction at power-on, so that the user's intention can be reflected. Also, when the operation is started in the switching mode, the terminal mode is selected. Thus the situation where there may be a plurality of radio apparatuses operating in the base station mode can be avoided and therefore the stability of communications can be maintained. Also, if no beacon signal is received, the mode will be switched from the terminal mode to the base station mode, so that the communication in switching mode can be executed. Also, if the received beacon signal is transmitted from an AP dedicated apparatus, the mode will be switched from the terminal mode to the base station mode, so that the communication in the switching mode can be executed separately from the communication in the infrastructure mode.

3. The Setting of Mode When Connected

An outline is first described. WPS (Wi-Fi Protected Setup) is being developed as a method for achieving a simple and easy connection of radio apparatuses in a wireless LAN. As a precondition for WPS, there is demand that the security protection on the wireless LAN access be enforced as the wireless LAN becomes widespread in recent years. Accordingly, instead of WEP (Wired Equivalent Privacy), WPA (Wi-Fi Protected Access) is developed and therefore the security protection on the wireless LAN access is enforced. In WEP, the length of encryption key or initial vector (IV) is short and therefore the message integrity cannot be guaranteed. On the other hand, the WPA employs a temporal key integrity protocol (TKIP), which extends the length of encryption key and can update the encryption key periodically, and a message integrity code (MIC) that detects the message falsification.

WPA supports pre-shared keys (PSK) to achieve mutual authentication. To form a wireless LAN network protected by PSK, the user needs to set PSK beforehand in both a base station apparatus and terminal apparatuses connecting to this base station apparatus. In addition to the setting of PSK, the user must set a service set identifier (SSID), by which to identify a wireless LAN network, and also perform many other settings to protect the security of the wireless LAN network.

WPS has been developed in order to alleviate such a burden imposed on users. In a radio apparatus 10 compatible with WPS, a personal identification number (PIN) is entered; alternatively, SSID, WPA and the like are set using a push-button configuration (PBC). Use of such a radio apparatus 10 compatible with WPS allows the user to easily build up a secure wireless LAN network.

If, in such a case, two radio apparatuses 10 are connected using the aforementioned WPS, the modes therefor must also be set. When the two radio apparatuses 10 have already been activated, the base station mode or the terminal mode has already been set in each of them. Since the setting of the modes may reflect the relation with the other radio apparatus 10, the same condition is preferably kept even after the establishment of connection therebetween. In order to cope with this, when a simple connection is to be made, the radio apparatus 10 according to the present exemplary embodiment sets the base station mode or the terminal mode so that the mode can be maintained before and after the connection has been established.

The structure of the radio apparatus 10 is of the same type as that shown in FIG. 3. A description is given here centering around the differences. A simple connection is established by WPS between a radio apparatus 10 and another radio apparatus 10 when said radio apparatus 10 and the another radio apparatus 10 are located within a distance range, where the their mutual packet signals can be received, and when the buttons of both the radio apparatus 10 and the another radio apparatus 10 are pressed down. In other words, when the simple connection is to be established, the user depresses the button of the operation unit 34 in said radio apparatus 10. When the control unit 32 detects that the button has been depressed, the simple connection is established by WPS between the radio apparatus 10 and the not-shown another radio apparatuses 10, via the radio unit 26, the modem unit 28 and the data processing unit 30. It is to be noted that known art may be employed for the simple connection by WPS and therefore the description thereof is omitted here.

As described earlier, the AP processing unit 50 or the STA processing unit 52 is activated in the data processing unit 30, and the storage 38 stores the information on whether the AP processing unit 50 or the STA processing unit 52 has been activated. This information thereon will be referred to as "mode information". The control unit 32 exchanges the mode information with the another radio apparatus 10 before the simple connection is established. There are two methods of mode exchange. One is a method where the control unit 32 transmits the mode information to the another radio apparatus 10 via the data processing unit 30, the modem unit 28 and the radio unit 26 and has the another radio apparatus 10 determine the mode.

The other one is a method where the control unit 32 receives the mode information sent from the another radio apparatus 10, via the radio unit 26, the modem unit 28 and the data processing unit 30 so as to determine the mode. In other words, either one of the radio apparatus 10 and the another radio apparatus 10 keeps track of the mode information on both of them and determines the modes for both of them. The thus determined modes are also conveyed to the radio apparatus 10 which is the communicating party. In other words, the control unit 32 starts the operation of the AP processing unit 50 or the STA processing unit 52 via the radio unit 26, the modem unit 28 and the data processing unit 30, based on a result of the mode information exchanged with the another radio apparatus 10.

For example, the rules to determine the mode are set herein as follows.

(1) Where both terminal apparatuses operate under the base station mode, the present mode is maintained. That is, an inter-base station communication is achieved between the both. Hereinafter, the inter-base station communication will be referred to as "inter-AP communication" also, and no distinction will be made between the terms "inter-base station communication" and "inter-AP communication". Since known art may be employed as the inter-base station communication, the description thereof is omitted here.

(2) Where one terminal apparatus already operates in the base station mode or has determined to operate in the base station mode, this terminal apparatus is set to the base station mode and the other is set to the terminal mode.

(3) Where both terminal apparatuses operate in the terminal mode and the both determine not to change the mode to the base station mode, the setting of the terminal mode is maintained. That is, the ad-hoc mode is achieved in the both. The case of "determining not to change the mode to the base station mode" corresponds to a case when the user does not desire the apparatus to operate in the base station mode and/or a case when the remaining amount of battery is low and/or the case when the receiving level drops and one or both of the terminal apparatuses moves to a different area.

Figure 5:
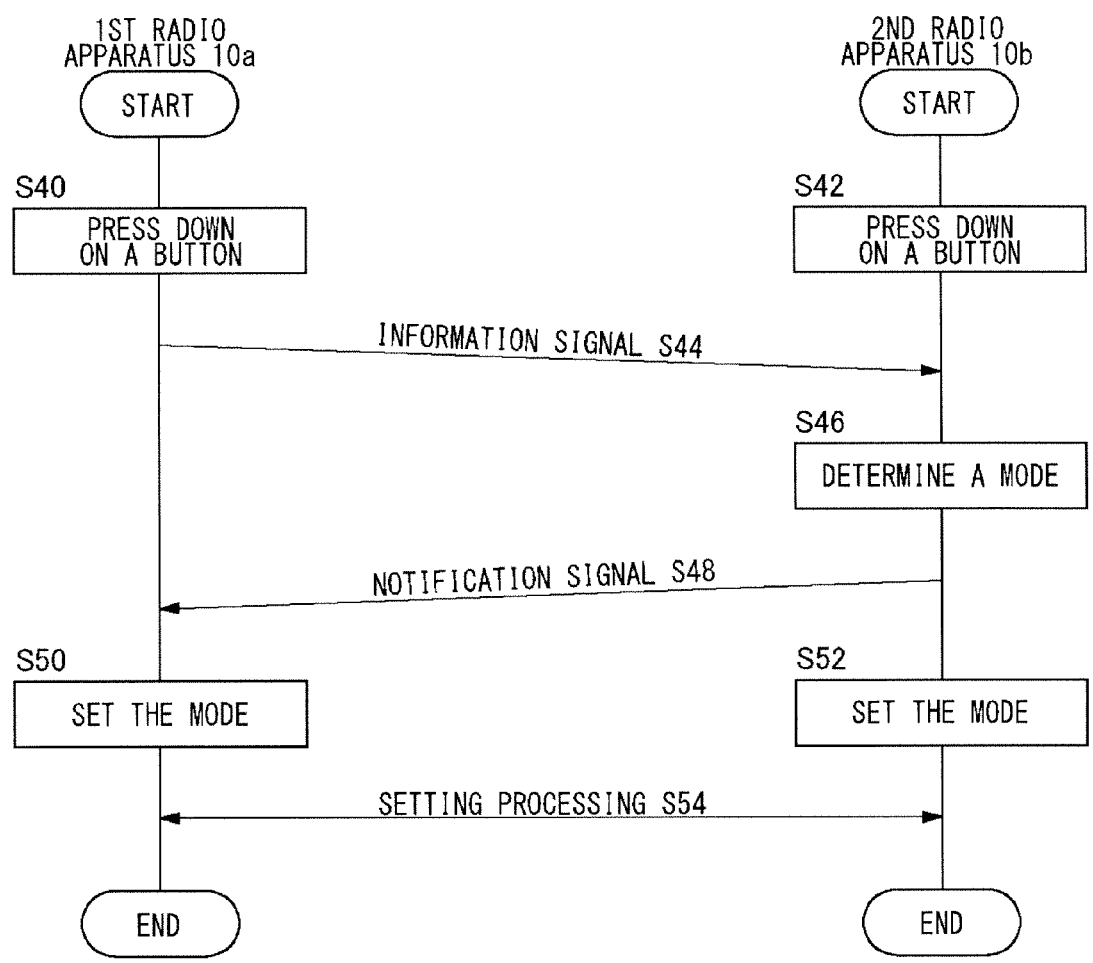
FIG. 5 is a sequence diagram showing a setting procedure in a communication system according to an exemplary embodiment of the present invention.

An operation of the communication system 100 configured as above will now be described. FIG. 5 is a sequence diagram showing a setting procedure in the communication system 100 according to an exemplary embodiment of the present invention. The button of the first radio apparatus 10a is pressed down (S40), and the button of the second radio apparatus 10b is pressed down as well (S42). The first radio apparatus 10a transmits the mode information to the second radio apparatus 10b as an information signal (S44). The second radio apparatus 10b determines a mode (S46). The second radio apparatus 10b transmits the thus determined mode to the first radio apparatus 10a as a notification signal (S48). The first radio apparatus 10a sets the mode (S50), and the second radio apparatus 10b sets the mode as well (S52). Both the first radio apparatus 10a and the second radio apparatus 10b perform the setting processing required by WPS (S54).

Figure 6:
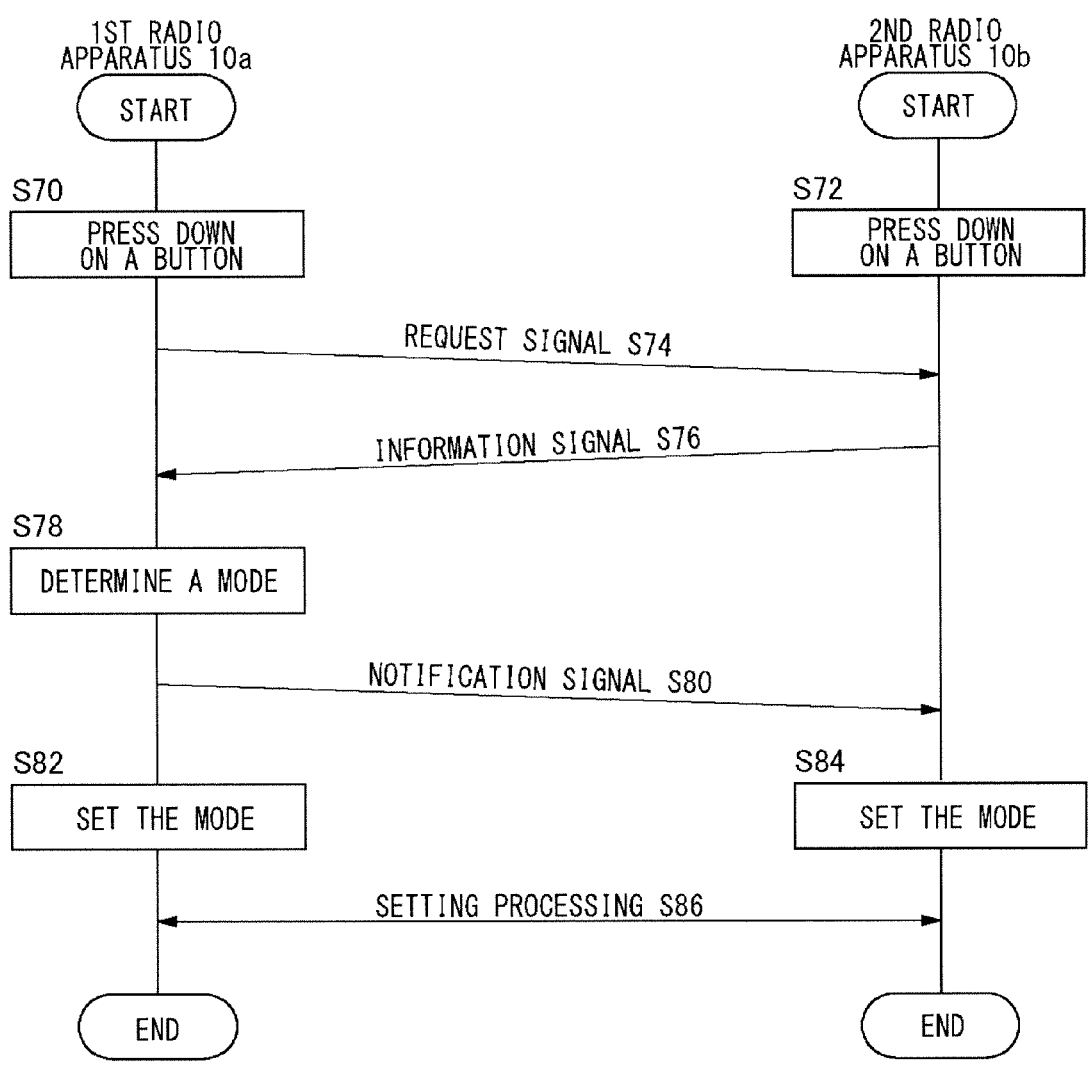
FIG. 6 is a sequence diagram showing another setting procedure in a communication system according to an exemplary embodiment of the present invention.

FIG. 6 is a sequence diagram showing another setting procedure in the communication system 100 according to the exemplary embodiment of the present invention. The button of the first radio apparatus 10a is pressed down (S70), and the button of the second radio apparatus 10b is pressed down as well (S72). The first radio apparatus 10a transmits a request signal for the transmission of mode information, to the second radio apparatus 10b (S74). The second radio apparatus 10b transmits the mode information to the first radio apparatus 10a as an information signal (S76). The first radio apparatus 10a determines a mode (S78). The first radio apparatus 10a transmits the determined mode to the second radio apparatus 10b as a notification signal (S80). The first radio apparatus 10a sets the mode (S82), and the second radio apparatus 10b sets the mode as well (S84). Both the first radio apparatus 10a and the second radio apparatus 10b perform the setting processing required by WPS (S86).

Figure 7:
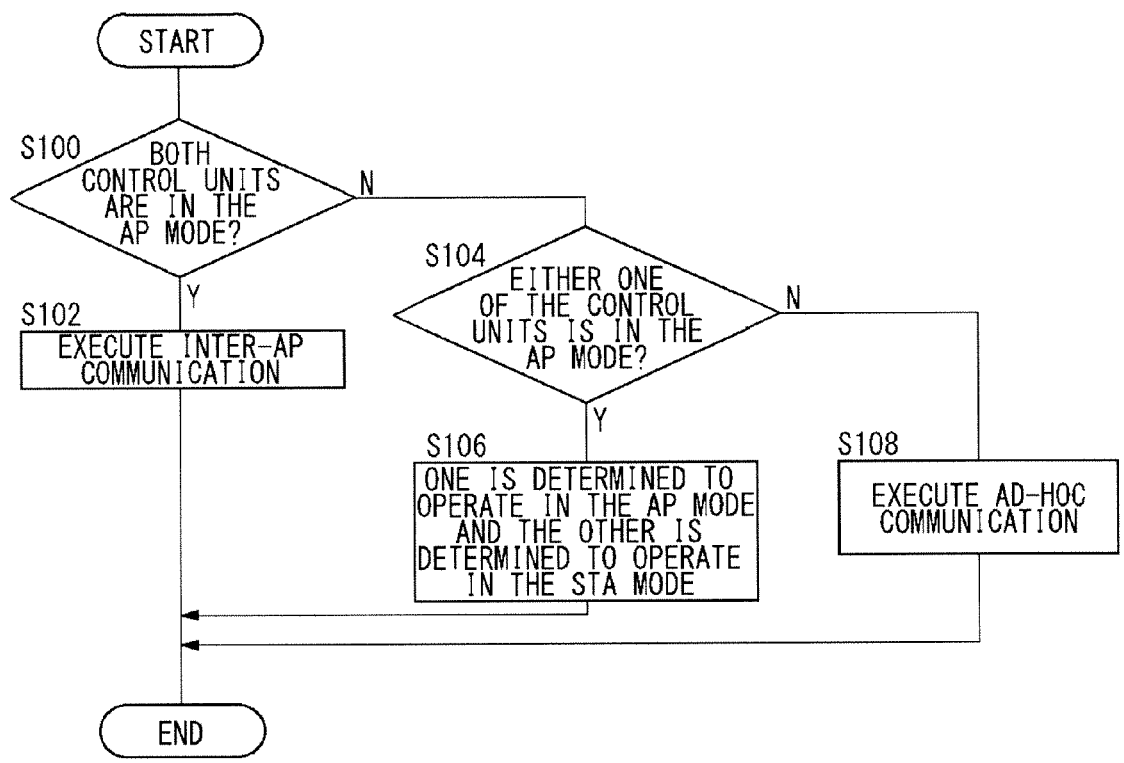
FIG. 7 is a flowchart showing a decision procedure in FIG. 5 or FIG. 6.

FIG. 7 is a flowchart showing a decision procedure in FIG. 5 or FIG. 6. If both the control unit 32 of the radio apparatus 10 and the control unit 32 of another radio apparatus 10 are in the AP mode (Y of S100), the inter-AP communication will be carried out (S102). If not both of them are in the AP mode (N of S100) and either one of them is in the AP mode (Y of S104), the one of them will be determined to be operated in the AP mode and the other in the STA mode (S106). If neither of them is in the AP mode (N of S104), the execution of the ad-hoc communication will be determined (S108).

By employing the present exemplary embodiment, the mode is adjusted when the simple connection is to be established. Thus the processing can transit smoothly to a communication state after the connection. Also, the mode that has been used so far is used as many times as possible, so that the adverse effect on the other radio apparatuses can be reduced.

4. Switching from AP Mode to STA Mode

An outline is first described. There are cases where a radio apparatus 10 operating in the base station mode requests the switching of the mode from the base station mode to the terminal mode. For example, there is a case when the remaining amount of battery is low. The stable communication is still required even when the radio apparatus 10 has switched the mode from the base station mode to the terminal mode. To cope with this situation, the radio apparatus 10 according to an exemplary embodiment of the present invention acquires the status of other radio apparatuses 10 on the periphery thereof and selects any one of the other radio apparatuses 10. Also, the radio apparatus 10 requests the thus selected another radio apparatus 10 to switch the mode to the base station mode.

Figure 8:
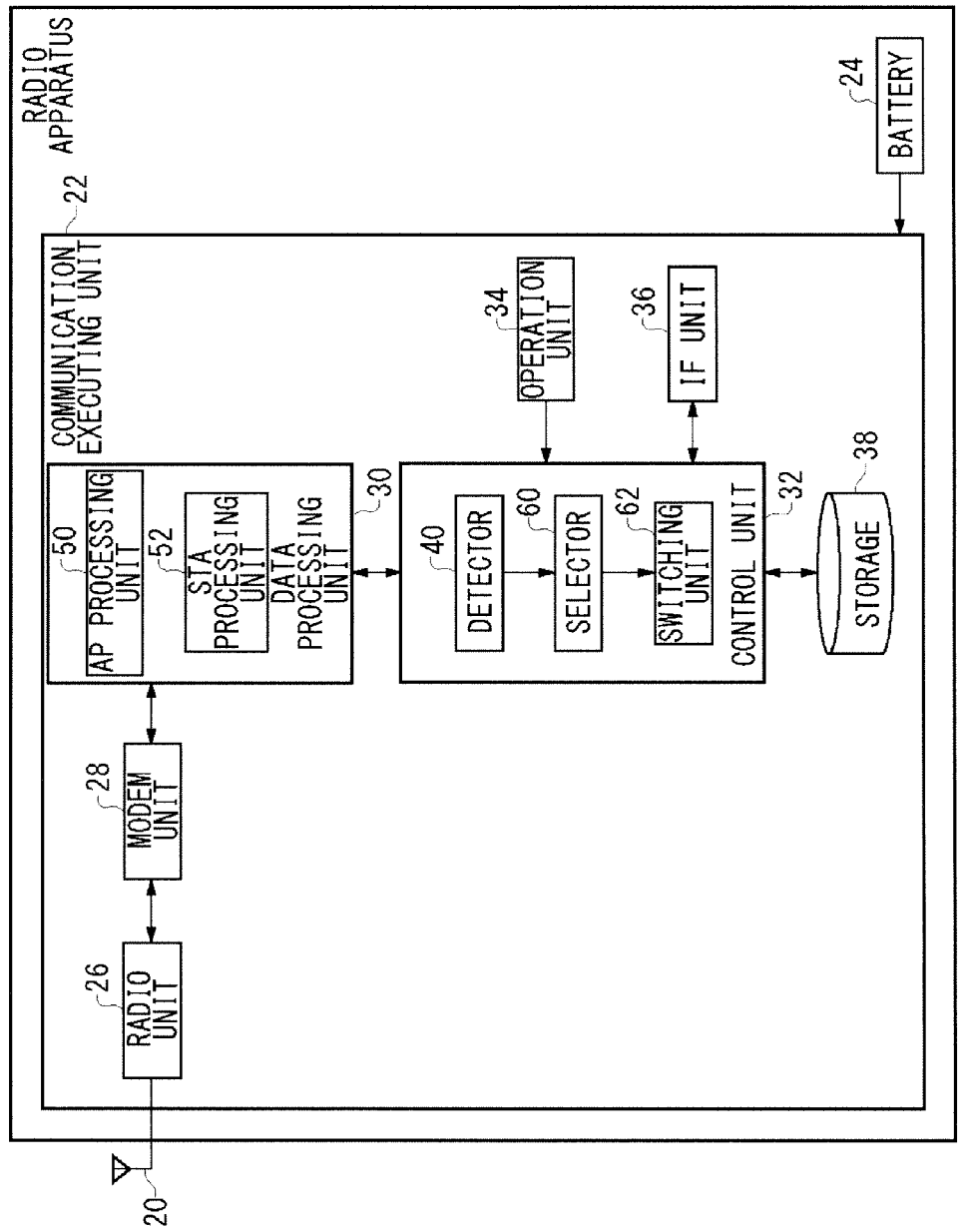
FIG. 8 illustrates another structure of a radio apparatus according to an exemplary embodiment of the present invention.

FIG. 8 illustrates another structure of the radio apparatus 10 according to the exemplary embodiment of the present invention. The structure of the radio apparatus 10 is of the same type as that shown in FIG. 3. A description is given here centering around the differences. The control unit 32 includes a detector 40, a selector 60, and a switching unit 62. The detector 40 monitors the remaining amount of a battery 24 included in the radio apparatus 10. If the detector 40 detects that the remaining amount of the battery 24 has dropped below a threshold value while the AP processing unit 50 is operating, namely while the base station mode is set, the detector 40 will report this situation to the selector 60.

Upon receipt of the notification reported from the detector 40, the selector 60 broadcasts the fact that the remaining amount of battery has dropped, to the other radio apparatuses 10 as the resource information via the AP processing unit 50, the modem unit 28 and the radio unit 26. After broadcasting the notification, the selector 60 acquires the resource information sent from the other radio apparatuses 10, via the radio unit 26, the modem unit 28 and the data processing unit 30. The resource information contains the information on the remaining amounts of battery in the other radio apparatuses 10, for instance. The selector 60 selects another radio apparatus 10 whose remaining amount of battery is greater than the threshold value. If there are a plurality of other radio apparatuses 10 whose remaining amounts of battery are greater than the threshold value, the selector 60 will select a radio apparatus 10 whose remaining amount of battery is the largest thereamong. The selector 60 instructs the thus selected another radio apparatus 10 to change the mode from the terminal mode to the base station mode, via the AP processing unit 50, the modem unit 28 and the radio unit 26. After the instruction has been outputted from the selector 60, the switching unit 62 stops the operation of the AP processing unit 50 and starts the operation of the STA processing unit 52. In other words, the switching unit 62 switches the operation of the data processing unit 30 from the base station mode to the terminal mode.

Figure 9:
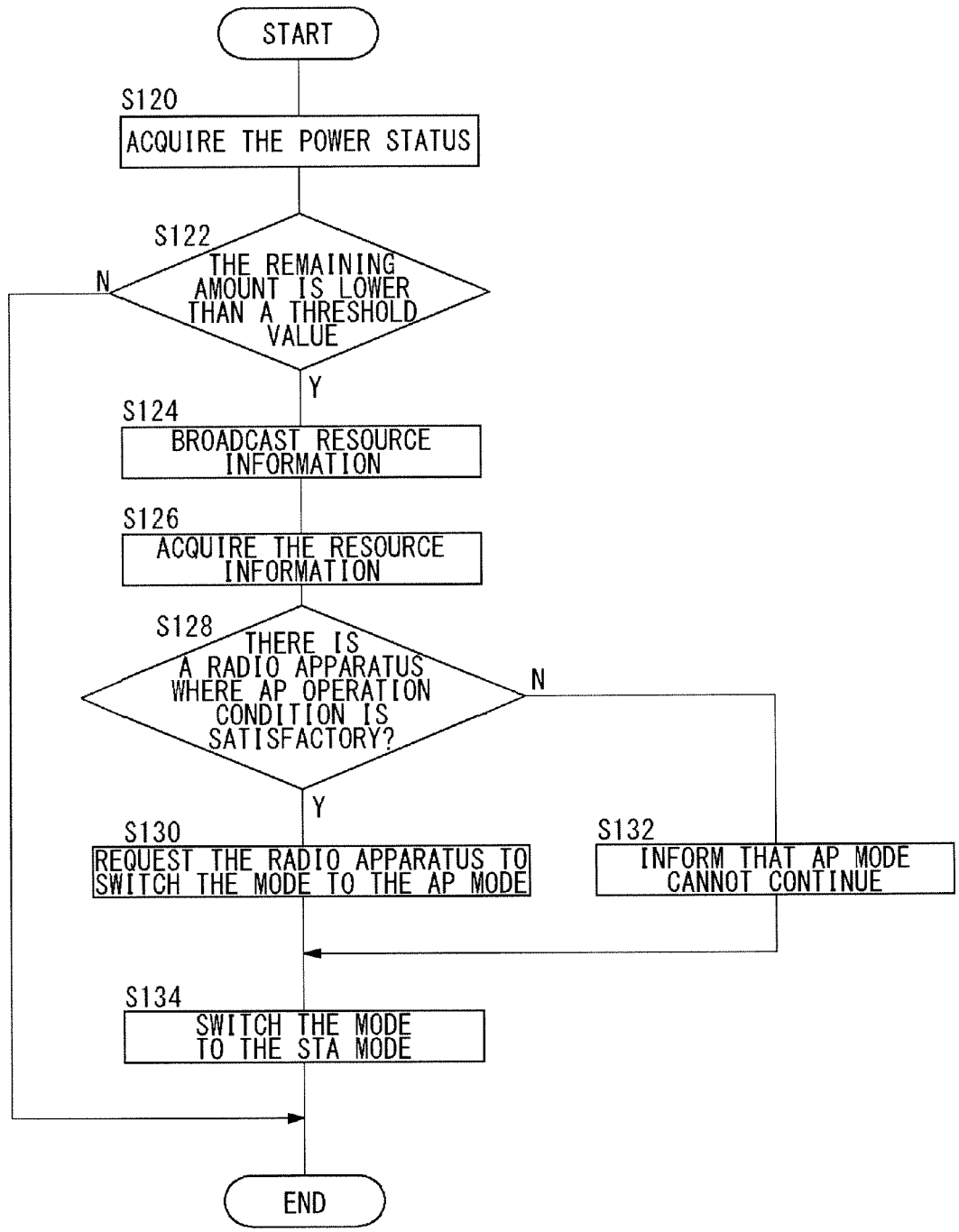
FIG. 9 is a flowchart showing a setting procedure performed by the radio apparatus of FIG. 8.

An operation of the communication system 100 configured as above will now be described. FIG. 9 is a flowchart showing a setting procedure performed by the radio apparatus 10. The detector 40 acquires the power status of the battery 24 (S120).

If the remaining amount of the battery 24 is lower than the threshold value (Y of S122), the selector 60 will broadcast the resource information (S124) and acquire the resource information (S126). If there is any radio apparatus where an AP operation condition is satisfactory (Y of S128), the selector 60 will request said radio apparatus 10 to switch the mode to the AP mode (S130). If, on the other hand, there is no radio apparatus where the AP operation condition is satisfactory (N of S128), the selector 60 will inform the situation where the AP mode cannot continue (S132). Then, the switching unit 62 switches the mode to the STA mode (S134). If the remaining amount of the battery 24 is not lower than the threshold value (N of S122), the processing will be terminated.

By employing the present exemplary embodiment, when the remaining amount of battery gets low, the mode is switched from the base station mode to the terminal mode, so that the battery consumption can be reduced. Also, the instruction of the switching of the mode to the base station mode is given to the another radio apparatus before the switching, so that the situation can be avoided where there is no radio apparatus that operates in the base station mode in the network. Since the situation where there is no radio apparatus that operates in the base station mode in the network is avoided, the stable communication can be maintained. Also, since the situation where there is no radio apparatus that operates in the base station mode in the network is avoided, the communication in the switching mode can be maintained.

5. Switching from STA Mode to AP Mode, and Returning to STA Mode from AP Mode

An outline is first described. A description has been given of a trigger effected when the mode of the radio apparatus is switched from the base station mode to the terminal mode. A description is now given of a case where the mode of the radio apparatus 10 is switched from the terminal mode to the base station mode and then a trigger is executed when the mode is returned again to the terminal mode from the base station mode. As described earlier, the radio apparatus 10 whose mode has been set to the base station mode communicates with a plurality of radio apparatuses 10 whose modes have been set to the terminal mode. That is, the processing amount of a radio apparatus 10 set in the base station mode is generally larger than the processing amount of a radio apparatus 10 set in the terminal mode. As a result, the power consumed by the radio apparatus 10 set in the base station mode tends to be larger than the power consumed by the radio apparatus 10 set in the terminal mode.

This leads to a reduction of the drive time of the battery. Also, as the processing amount increases in the base station mode, the execution speed at which the other processings are executed may be slowed down. For these reasons, the radio apparatus 10 set in the base station mode is likely to suffer more severe disadvantage than the radio apparatus 10 set in the terminal mode does. Thus, where a plurality of radio apparatuses 10 are included in the communication system 100, the base station mode must be executed equally among them. At the same, considering the remaining amount of battery, the processing speed and so forth, it is preferable that the base station mode is executed not so equally among them. To cope with this, the communication system 100 performs the following processes.

A radio apparatus 10 set in the base station mode receives information on the remaining amount of battery (hereinafter referred to as "remaining amount information") from a plurality of other radio apparatuses 10. Note that the plurality of other radio apparatuses 10 are each set to the terminal mode. The radio apparatus 10 set in the base station mode assigns priority levels to the plurality of other radio apparatuses 10, respectively, based on the remaining amount information, and generates a list of names of the radio apparatuses 10 in the order of priority (hereinafter referred to as "candidate list"). Here, the priority levels indicate the orders which are set to the base station modes in the future. Also, the radio apparatus 10 set in the base station mode derives a time length during which it is set to the base station mode for each of the other radio apparatuses 10 (hereinafter referred to as "setting period") based on the remaining amount information, and includes the thus derived periods in the candidate list.

After the setting period for the own radio apparatus 10 has elapsed, this radio apparatus 10 set in the base station mode instructs a radio apparatus 10, whose priority level is the highest, to switch the mode thereof to the base station mode. At that time, the candidate list is also transmitted. The thus instructed radio apparatus 10 switches the mode from the terminal mode to the base station mode, and executes a process for the base station mode over a setting period contained in the candidate list. At the same time, the radio apparatus 10 previously set to the base station mode returns to the terminal mode. A radio apparatus 10, which is newly set to the base station mode, lowers its priority level in the candidate list and receives the remaining amount information from the other radio apparatuses 10 so as to update the candidate list. After this, these processes are repeatedly carried out so as to update the candidate list, and any one of the plurality of radio apparatuses 10 takes turns to operate as the base station mode according to the candidate list.

Figure 10:
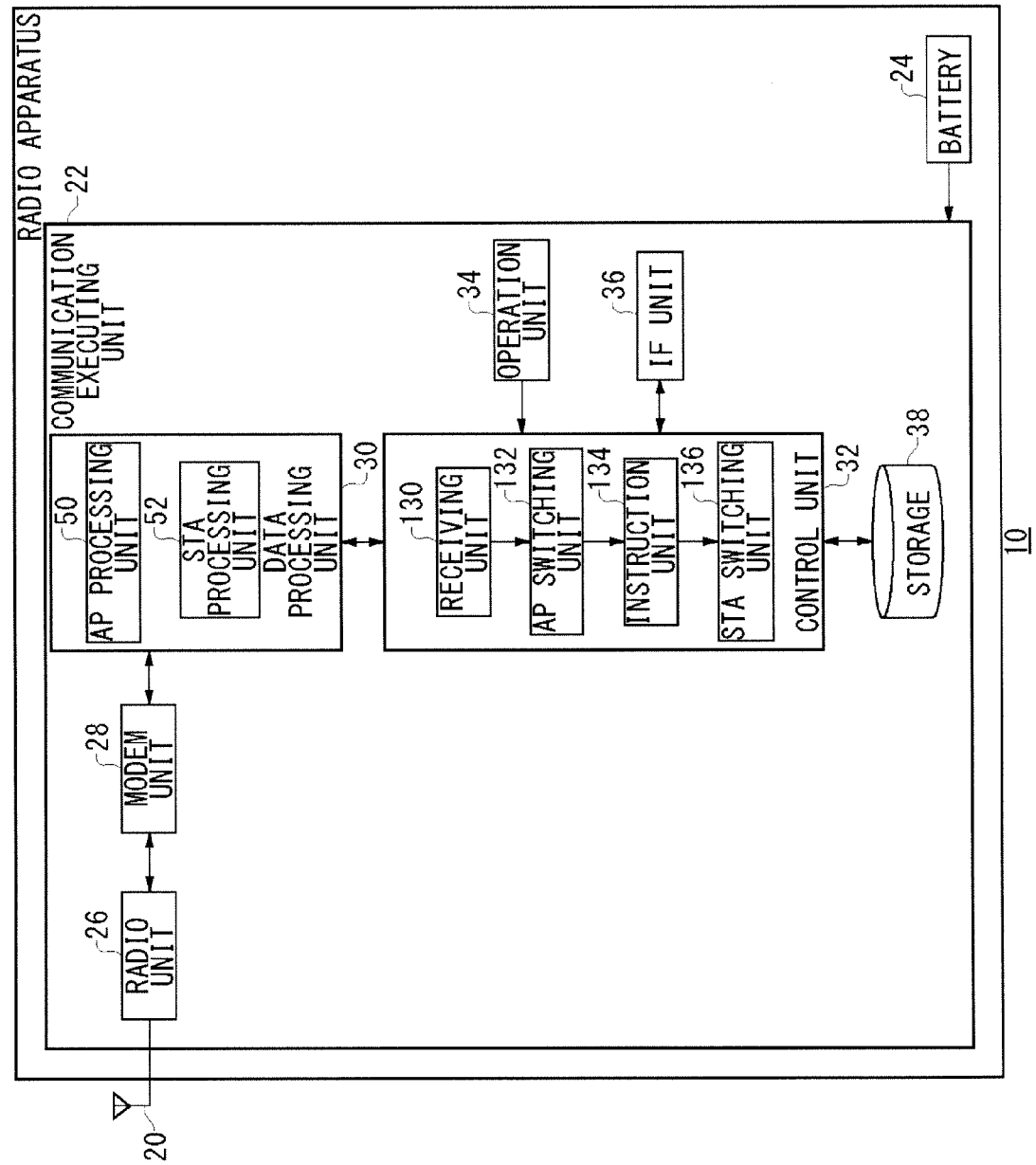
FIG. 10 illustrates still another structure of a radio apparatus according to an exemplary embodiment of the present invention.

FIG. 10 illustrates still another structure of the radio apparatus 10 according to the exemplary embodiment of the present invention. The structure of the radio apparatus 10 in FIG. 10 is of the same type as that shown in FIG. 3. A description is given here centering around the differences. The control unit 32 includes a receiving unit 130, an AP switching unit 132, an instruction unit 134, and a STA switching unit 136. As described earlier, the AP processing unit 50 carries out communications in the base station mode, whereas the STA processing unit 52 carries out communications in the terminal mode; the communications are carried out using the packet signals by selecting either the AP processing unit 50 or the STA processing unit 52. The control unit 32 controls the data processing unit 30 so that the AP processing unit 50 or the STA processing unit 52 is selected. Assume herein for the convenience of explanation that the STA processing unit 52 is selected.

The receiving unit 130 receives instructions, sent from another radio apparatus (not shown) set in the base station, as to the switching to the base station mode (hereinafter referred to as "switching instruction") via the radio unit 26, the modem unit 28 and the STA processing unit 52. At that time, the receiving unit 130 receives the candidate list together with the switching instruction. As discussed earlier, the candidate list indicates the priority order of the radio apparatuses 10 in which each of them is to be switched to the base station mode. The receiving unit 130 stores the candidate list in the storage 38. FIG. 11 shows a structure of data of the candidate list stored in the storage 38. As shown in FIG. 11, the candidate list contains a priority level column 300, a radio apparatus name column 302, a column 304 for the remaining amount of battery, and an AP mode period column 306. The priority level column 300 indicates the order in which each radio apparatus 10 is to be switched to the base station mode.

Radio apparatuses 10 corresponding respectively to the priority levels in the priority level column 300 are indicated in the radio apparatus name column 302. Here, radio apparatus A in the priority level "1" is the present radio apparatus 10. The remaining amount of battery for each radio apparatus 10 is indicated in the column 304 for the remaining amount of battery. The AP mode period column 306 indicates a period of time during which each radio apparatus 10 is to set the mode to the base station mode. An update process for updating the column 304 for the remaining amount of battery and the AP mode period column 306 will be described later. Now, refer back to FIG. 10. The receiving unit 130 outputs the switching instruction and the candidate list to the AP switching unit 132.

The AP switching unit 132 receives the switching instruction and the candidate list from the receiving unit 130. The AP switching unit 132 switches the operation of the STA processing unit 52 to the operation of the AP processing unit 50 according to the switching instruction. That is, the AP switching unit 132 completes the processing in the STA processing unit 52 and activates the AP processing unit 50. As a result, the mode of the present radio apparatus 10 switches from the terminal mode to the base station mode. The processing performed by the AP processing unit 50 is similar to that described so far and therefore the description thereof is omitted here. After the operation has been switched to the operation performed by the AP processing unit 50, the AP switching unit 132 generates a packet signal containing information indicating that the radio apparatus 10 set in the base station mode has been switched.

The AP switching unit 132 broadcasts the packet signal via the AP processing unit 50, the modem unit 28 and the radio unit 26. As a result, the other radio apparatuses 10 included in the communication system 100 recognize that the radio apparatus 10 set in the base station mode has been switched. Also, the AP switching unit 132 references the AP mode period column 306 contained in the candidate list of FIG. 11 and thereby identifies the period of time during which the radio apparatus 10 is to set the mode to the base station mode. Also, the AP switching unit 132 has the AP processing unit 50 operate over the identified period of time.

When the AP switching unit 132 has the AP processing unit 50 operate accordingly, the AP switching unit 132 receives the packet signal containing information on the capacity of said radio apparatus 10, from the other radio apparatuses 10 via the radio unit 26, the modem unit 28 and the AP processing unit 50. Here, the information on the capacity of said radio apparatus 10 is the remaining amount information, for instance. Since the other radio apparatuses 10 have already received the packet signal containing the information indicating that the radio apparatus 10 set in the base station mode has been switched, they set their destination based on said information and then generate packet signals containing the remaining amount information. The timing with which to transmit such a packet signal may be arbitrary and the AP switching unit 132 may not receive the packet signals from all of the other radio apparatuses 10.

In other words, the AP switching unit 132 receives the packet signals sent from a plurality of other radio apparatuses 10 while the AP processing unit 50 is in operation, and thereby gathers information on the capacity of the plurality of other radio apparatuses 10. On the other hand, when the STA processing unit 52 is in operation, the STA processing unit 52 may generate the remaining amount information by accessing the battery 24 and transmit a packet signal containing the remaining amount information. The destination of the packet signal is another radio apparatus 10 set in the base station mode.

The AP switching unit 132 updates the candidate list stored in the storage 38, according to the information on the capability of the plurality of other radio apparatuses. More specifically, the AP switching unit 132 first assigns the lowest priority level to the present radio apparatus 10 having the highest priority level in the candidate list and thereby reassigns a priority level to each radio apparatus 10. Also, the AP switching unit 132 verifies the source of the packet signal containing the information on the capability of the plurality of other radio apparatuses 10 so as to identify radio apparatuses included in the radio apparatus name column 302. Also, the information of the column 304 for the remaining amount of battery in FIG. 11 is updated based on the remaining amount information contained in this packet signal. Further, the AP switching unit 132 updates the period of time during which each radio apparatus 10 is to set the mode to the base station mode, based on the remaining amount of battery.

Here, the period of time during which each radio apparatus 10 is to set the mode to the base station mode is associated beforehand with the remaining amount of battery. And the AP switching unit 132 determines the period of time according to the remaining amount of battery by referencing this correspondence between the period of time and the remaining amount of battery. For instance, in this correspondence, the remaining amount of battery and the period of time are defined in such a manner that the lower the remaining amount of battery becomes, the shorter the period of time will be. In other words, the period of time during which the radio apparatus 10 is to set the mode to the base station mode is determined according to the capability of said radio apparatus 10. Here, the AP switching unit 132 may update the priority level in such a manner that a higher priority level is assigned to a radio apparatus having a longer period of time during which the base station mode is to be set. In so doing, the AP switching unit 132 does not raise the priority level of the another radio apparatus 10 that has transmitted the switching instruction received by the receiving unit 130. Updating, as described above, the candidate list according to the remaining amount of battery is done as appropriate while the AP processing unit 50 is in operation. Also, the AP processing unit 50 may determine the transmission timing which is beneficial to its own radio apparatus only, by setting a period of time during which its own radio apparatus is only allowed to communicate within transmission intervals of beacons, for instance. This feature is advantageous to the radio apparatus 10 set in the base station mode.

The instruction unit 134 receives, from the AP switching unit 132, information indicating that the period of time during which the base station mode is to be set has completed or is about to end. Then the operation unit 34 extracts the candidate list from the storage 38 and selects another radio apparatus 10 whose priority level is the highest. In other words, the instruction unit 134 selects another radio apparatus 10 set in the terminal mode, according to the candidate list. The operation unit 34 generates a packet signal containing the switching instruction and the candidate list, wherein the destination of the packet signal is the selected another radio apparatus 10.

After the period of time during which the base station mode is to be set has elapsed, the instruction unit 134 transmits the packet signal via the AP processing unit 50, the modem unit 28 and the radio unit 26. That is, after the period of time indicated in the candidate list has elapsed, the instruction unit 134 instructs the another radio apparatus 10 set in the terminal mode to switch the mode to the base station mode. As described above, the instruction unit 134 selects another radio apparatus different from the another radio apparatus 10 that has transmitted the switching instruction received by the receiving unit 130, as the another radio apparatus 10 set in the terminal mode.

After the packet signal containing the switching instruction has been transmitted from the instruction unit 134, the STA switching unit 136 returns the operation of the AP processing unit 50 to the operation of STA processing unit 52. That is, the STA switching unit 136 switches the mode of the radio apparatus 10 from the base station mode to the terminal mode.

Figure 12:
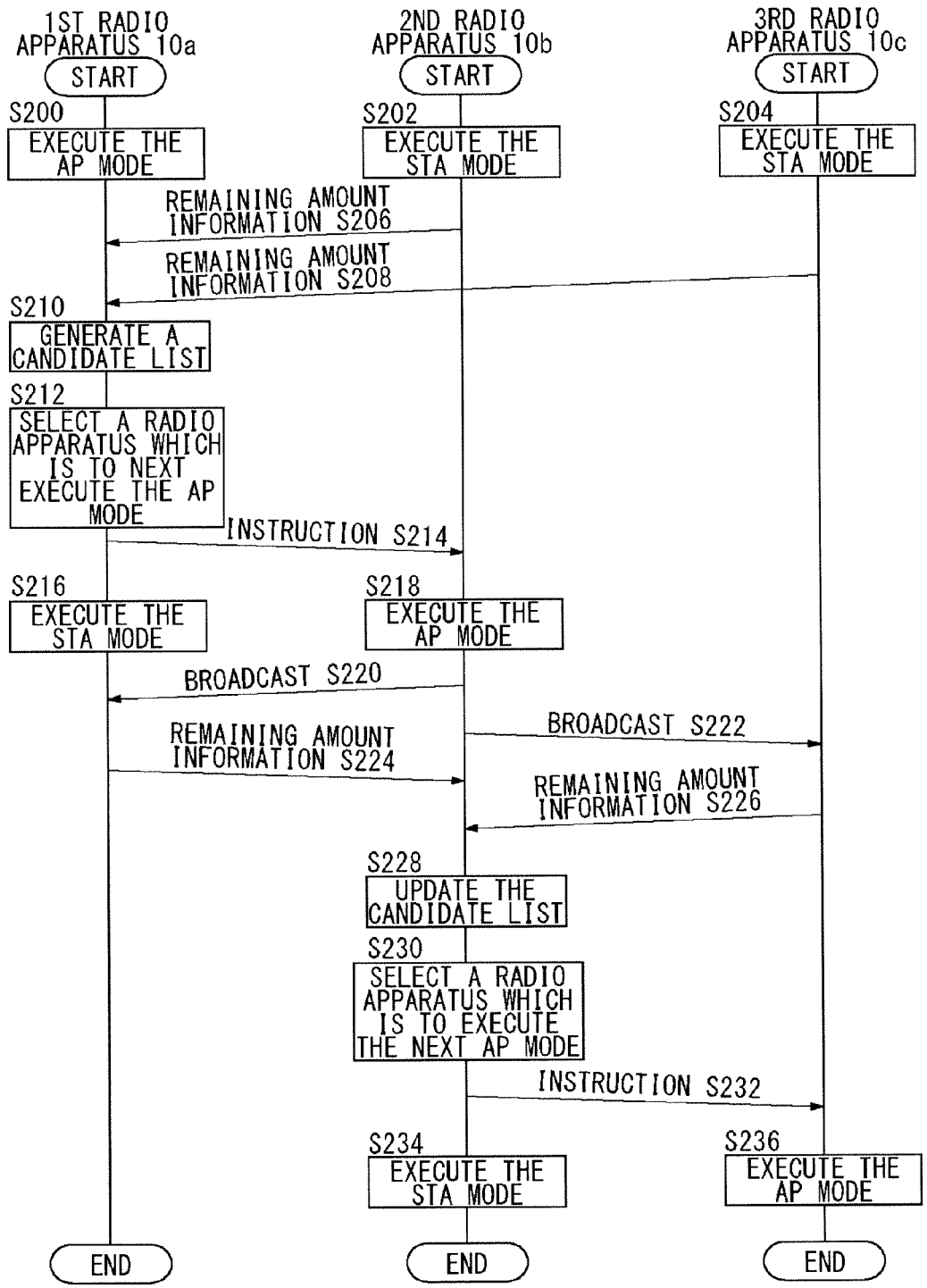
FIG. 12 is a sequence diagram showing still another setting procedure in a communication system according to an exemplary embodiment of the present invention.

An operation of the communication system 100 structured as above is now described. FIG. 12 is a sequence diagram showing still another setting procedure in the communication system 100 according to the exemplary embodiment of the present invention. For the clarity of explanation, assume herein that the communication system 100 includes the first radio apparatus 10a, the second radio apparatus 10b and the third radio apparatus 10c. The first radio apparatus 10a executes the AP mode (S200), whereas the second radio apparatus 10b and the third radio apparatus 10c execute the STA mode (S202, S204). The second radio apparatus 10b transmits the remaining amount information to the first radio apparatus 10a (S206), and the third radio apparatus 10c transmits the remaining amount information to the first radio apparatus 10a (S208). The first radio apparatus 10a generates a candidate list (S210).

The first radio apparatus 10a selects a radio apparatus 10, which is to next execute the AP mode, based on the candidate list (S212). The first radio apparatus 10a transmits a switching instruction to the second radio apparatus 10b (S214). The first radio apparatus 10a executes the STA mode (S216), and the second radio apparatus 10b executes the AP mode (S218). The second radio apparatus 10b broadcasts to the first radio apparatus 10a and the third radio apparatus 10c that the mode of the second radio apparatus 10b has been switched to the AP mode (S220, S222). The first radio apparatus 10a transmits the remaining amount information to the second radio apparatus 10b (S224), and the third radio apparatus 10c transmits the remaining amount information to the second radio apparatus 10b (S226).

The second radio apparatus 10b updates the candidate list (S228). The second radio apparatus 10b selects a radio apparatus 10, which is to next execute the AP mode, based on the updated candidate list (S230). The second radio apparatus 10b transmits a switching instruction to the third radio apparatus 10c (S232). The second radio apparatus 10b executes the STA mode (S234), and the third radio apparatus 10c executes the AP mode (S236).

Figure 13:
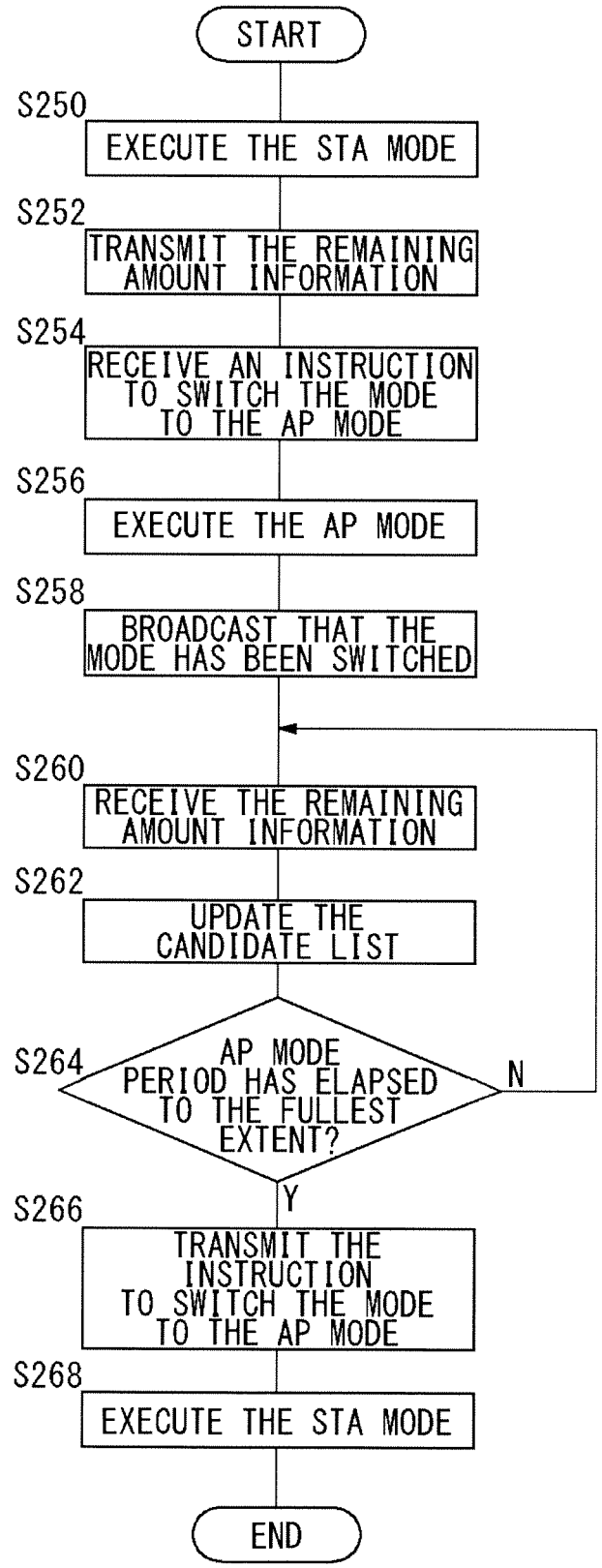
FIG. 13 is a flowchart showing a setting procedure performed by the radio apparatus of FIG. 10.

FIG. 13 is a flowchart showing a setting procedure performed by the radio apparatus 10. The STA processing unit 52 executes the STA mode (S250). Also, the STA processing unit 52 transmits the remaining amount information via the modem unit 28 and the radio unit 26 (S252). The receiving unit 130 receives a switching instruction to switch the mode to the AP mode (S254). The AP switching unit 132 executes the AP mode by activating the AP processing unit 50 (S256). The AP switching unit 132 broadcasts, via the AP processing unit 50, the modem unit 28 and the radio unit 26, that the mode has been switched to the AP mode (S258). The AP switching unit 132 receives the remaining amount information via the radio unit 26, the modem unit 28 and the AP processing unit 50 (S260) and updates the candidate list (S262).

If the period of time set for the AP mode has not yet elapsed to the fullest extent (N of S264), return to Step 260. If, on the other hand, the period of time set for the AP mode ends (Y of S264), the instruction unit 134 will transmit a switching instruction to switch the mode to the AP mode, via the AP processing unit 50, the modem unit 28 and the radio unit 26 (S266). After the switching instruction has been transmitted, the STA switching unit 136 executes the STA mode by activating the STA processing unit 52 (S268).

By employing this exemplary embodiment, where there are a plurality of radio apparatuses capable of executing the base station mode and the terminal mode, the setting of the base station mode is sequentially switched among the plurality of radio apparatuses. Thus, the plurality of radio apparatuses can equally execute the base station mode. Also, the mode is switched from the terminal mode to the base station mode, based on the switching instruction sent from the radio apparatus set in the base station mode. Thus, the setting of the base station mode is sequentially switched among the plurality of radio apparatuses. Also, the priority levels in the candidate list repeats cyclically with the switching instruction given each time, so that the switching instruction is given to a different radio apparatus every time the switching instruction is given.

Also, the radio apparatus set in the base station mode specifies to the next radio apparatus the period of time during which the next radio apparatus is to be set to the base station. Thus, the frequent switching after a short period of time set for the base station mode can be avoided. Since the frequent switching after a short period of time set for the base station mode is avoided, the communication efficiency can be improved. Since the candidate list is updated, the candidate list reflects the most recent information. Also, another radio apparatus different from the another radio apparatus that has transmitted the switching instruction is selected, so that the quality can be improved. Also, the period of time during which the base station mode is to be set is set based on the remaining amount information, so that the remaining amount of battery for each radio apparatus can be taken into consideration.

The present invention has been described based on the exemplary embodiment. This exemplary embodiment is intended to be illustrative only, and it is understood by those skilled in the art that various modifications to constituting elements and processes as well as arbitrary combinations thereof could be developed and that such modifications and combinations are also within the scope of the present invention.

According to the present exemplary embodiments, the period of time during which the base station mode is to be set is determined, based on the remaining amount information, in the candidate list updated by the AP switching unit 132. However, the exemplary embodiments are not limited thereto and, for example, the period of time during which the base station mode is to be set may be determined based on information other than the remaining amount information. For instance, the period of time may be determined based on the speed of CPU mounted on the radio apparatus 10. As the speed of CPU is higher, such a radio apparatus can execute many other processes even if it executes the base station mode. In other words, the higher the CPU speed is, more suitable to the base station mode such a radio apparatus will be. Also, the period of time during which the base station mode is to be set may be a combination of the remaining amount information and the CPU speed. According to this modification, a radio apparatus 10 having a higher processing speed can be set to the base station mode over a longer period of time.

DESCRIPTION OF THE REFERENCE NUMERALS

10 Radio apparatus
20 Antenna
22 Communication execution unit
24 Battery
26 Radio unit
28 Modem unit
30 Data processing unit 32 Control unit
34 Operation unit
36 IF unit
38 Storage
40 Detector
42 Fixed-mode receive unit
44 Switching-mode receive unit
46 Switching unit
48 Maintenance unit
50 AP processing unit
52 STA processing unit
60 Selector
62 Switching unit
100 Communication system
130 Receiving unit
132 AP switching unit
134 Instruction unit
136 STA switching unit

INDUSTRIAL APPLICABILITY

The present invention properly sets either one of a base station mode and a terminal mode in a radio apparatus having the two modes.

What is claimed is:

1. A communication radio apparatus, comprising:
a communication unit configured to select either one of a base station mode and a terminal mode so as to perform a communication in a network wherein
in the base station mode, a plurality of other radio apparatuses, which are in the terminal mode, are connected to said radio apparatus, and
in the terminal mode, said radio apparatus is connected to another radio apparatus which is in the base station mode; and
a control unit configured to control the mode of said communication unit, said control unit including:
a receiving unit configured to receive a first instruction to switch the mode of the communication unit to the base station mode, when said communication unit is in the terminal mode;
a first switching unit configured to switch said communication unit to the base station mode based on reception of said first instruction by said receiving unit;
an instruction unit configured to send, via said communication unit, to another radio apparatus in the network, which is in the terminal mode, a second instruction to switch to the base station mode; and
wherein said first and second instructions include a list comprising priority levels associated with radio apparatuses of the network indicating the order in which the radio apparatuses in the network are to be set in the base station mode,
wherein said first and second instructions contain information on a period of time during which said radio apparatuses in the network are to be set in the base station mode, said period of time being determined based on capability information of said radio apparatuses,
wherein said control unit further includes:
a collection unit configured to collect said capability information;
an update unit configured to update the list received by said receiving unit, depending on the information collected by the collection unit, and
a second switching unit configured to switch said communication unit to the terminal mode after a period of time associated to said communication radio apparatus indicated in said first instruction,
wherein said second instruction includes said updated list,
wherein the list included in said second instruction also includes a priority level associated to said communication radio apparatus, and wherein the priority level of said communication radio apparatus in the list included in said second instruction is lower than the priority level of said communication radio apparatus in the list included in said first instruction.

2. The communication radio apparatus according to claim 1, wherein the priority level of said communication radio apparatus in the list included in said second instruction is the lowest among all the priority levels associated to the radio apparatuses mentioned in the list included in said second instruction.

* * * * *